(12) United States Patent
Chen et al.

(10) Patent No.: US 7,046,632 B2
(45) Date of Patent: May 16, 2006

(54) METHOD AND SWITCH CONTROLLER FOR RELIEVING FLOW CONGESTION IN NETWORK

(75) Inventors: Jen-Kai Chen, Taipei (TW); Yu-Ju Lin, Taipei (TW); Jiann-Hwa Liou, Taichung (TW)

(73) Assignee: VIA Technologies, Inc., Taipei Hsien (TW)

( * ) Notice: Subject to any disclaimer, the term of this patent is extended or adjusted under 35 U.S.C. 154(b) by 907 days.

(21) Appl. No.: 09/858,680

(22) Filed: May 15, 2001

(65) Prior Publication Data

US 2001/0043565 A1    Nov. 22, 2001

(30) Foreign Application Priority Data

Apr. 1, 2000    (TW)  ............................. 89106159 A
May 20, 2000    (TW)  ............................. 89109750 A

(51) Int. Cl.
*H04L 12/28*    (2006.01)
*H04L 12/56*    (2006.01)

(52) U.S. Cl. ..................... 370/236; 370/230; 370/389; 370/412

(58) Field of Classification Search ............... 370/230, 370/230.1, 231, 235, 236, 389, 392, 395.1, 370/401, 412, 417, 418, 428, 429
See application file for complete search history.

(56) References Cited

U.S. PATENT DOCUMENTS

| | | | | |
|---|---|---|---|---|
| 5,859,837 A | * | 1/1999 | Crayford | 370/230 |
| 5,909,564 A | * | 6/1999 | Alexander et al. | 710/316 |
| 5,923,654 A | * | 7/1999 | Schnell | 370/390 |
| 6,034,957 A | * | 3/2000 | Haddock et al. | 370/392 |
| 6,061,362 A | * | 5/2000 | Muller et al. | 370/463 |
| 6,118,761 A | * | 9/2000 | Kalkunte et al. | 370/229 |
| 6,256,306 B1 | * | 7/2001 | Bellenger | 370/389 |
| 6,347,089 B1 | * | 2/2002 | Tsui et al. | 370/425 |
| 6,405,258 B1 | * | 6/2002 | Erimli et al. | 709/235 |
| 6,539,488 B1 | * | 3/2003 | Tota et al. | 713/400 |
| 6,570,848 B1 | * | 5/2003 | Loughran et al. | 370/230.1 |
| 6,628,613 B1 | * | 9/2003 | Joung et al. | 370/230 |
| 6,631,134 B1 | * | 10/2003 | Zadikian et al. | 370/395.21 |
| 6,680,910 B1 | * | 1/2004 | Ni | 370/235 |
| 6,724,725 B1 | * | 4/2004 | Dreyer et al. | 370/231 |
| 6,741,559 B1 | * | 5/2004 | Smeulders et al. | 370/230 |
| 6,760,338 B1 | * | 7/2004 | Merchant et al. | 370/395.7 |
| 6,917,614 B1 | * | 7/2005 | Laubach et al. | 370/392 |
| 2003/0110344 A1 | * | 6/2003 | Szczepanek et al. | 711/100 |

* cited by examiner

*Primary Examiner*—Hanh Nguyen
*Assistant Examiner*—Ahmed Elallam
(74) *Attorney, Agent, or Firm*—J.C. Patents

(57) ABSTRACT

A switch controller using a congestion control method can relieve congestion in a network. The Ethernet switch controller has the capacity to select a suitable congestion control mode according to each connection port and state of the connected device. If a flow control mode is selected, the switch controller issues a flow control frame and waits for the passing of a guard period roughly equivalent to a period of about inputting three packets. If the connected device continues to transmit network packets after the guard period, the switch controller switches from the flow control mode to a drop control mode. Hence, the received packets are discarded and congestion is prevented. Consequently, the switch controller of this invention can still carry out congestion control operation when the switch controller is connected to a device having no standard flow control capability.

11 Claims, 4 Drawing Sheets

METHOD AND SWITCH CONTROLLER FOR RELIEVING FLOW CONGESTION IN NETWORK

CROSS-REFERENCE TO RELATED APPLICATION

This application claims the priority benefit of Taiwan application serial no. 89109750, filed May 20, 2000. The present application is also related to Taiwan application serial number 89106159 filed Apr. 1, 2000, entitled "METHOD AND SWITCH CONTROLLER FOR EASING FLOW CONGESTION IN NETWORK", which is also filed on Mar. 29, 2001 in U.S.A.

BACKGROUND OF THE INVENTION

1. Field of Invention

The present invention relates to an Ethernet switch controller. More particularly, the present invention relates to an Ethernet switch controller capable of relieving flow congestion in a network.

2. Description of Related Art

Ethernet is a kind of local area network (LAN) standard, most widely used in communication. However, due to a data transmission rate of mere 10 Mbps, a conventional Ethernet can hardly transmit the vast quantity of data flow required in a multi-media system. Consequently, a faster Ethernet system having a data transmission rate of 100 Mbps called Fast Ethernet appears. In the Fast Ethernet design, a physical coding sublayer (PCS) is introduced between a medium access control (MAC) sublayer and a physical medium dependency (PMD) sublayer. To use the Fast Ethernet system, the network interface card in each network workstation has to be replaced by a 100 Mbps fast Ethernet interface card. If one wants to keep the network interface card in each workstation but raise the transmission speed, an Ethernet switch must be employed. In fact, by retaining the original network interface card in each workstation, the 10 Mbps Ethernet equipment formerly invested by a company can be incorporated into the Fast Ethernet network through the Ethernet switch.

The conventional Ethernet, using twisted pair (whether the data transmission rate is 10 Mbps or 100 Mbps), is necessary to be connected to a server via an Ethernet hub, so as to share the network information. In general, the bandwidth of an Ethernet hub is normally shared by all the workstations connected to the network. For example, for a 16 port 100 Mbps Ethernet hub, if four workstations are connected to the network, the bandwidth is shared between these four workstations. On the other hand, if each of the 16 ports is connected to a workstation, the bandwidth is shared between all sixteen workstations. As the number of network user increases, the number of collisions in the network increases proportionately. Hence, network bandwidth available for each user accordingly decreases when the number of users increases. In a multimedia-craved world, a conventional Ethernet hub can hardly meet requirement of the information traffic demanded by concurrent users.

The Ethernet switch is a new concept for improving data flow so that each of the workstations connected to the device is able to enjoy a faster data transmission. To achieve correct data switching, the switch keeps the records of the various connections between each workstation and each connection port. In other words, the switch must have a module for recording all the addresses similar to a bridging device. When the switch receives a frame, the device will consult a path lookup table to find the destination port with respect to the destination workstation. If the destination workstation is found, a controller will send out a control signal to the switching element redirecting the frame to the destination port. On the contrary, if the destination workstation is not found, the frame is broadcast to all the connection ports just to ensure that the destination workstation is able to receive this frame.

The institute of electrical & electronics engineering (IEEE) has provided a standard specification 802.3u for network management 802.3u capable of simplifying network management. The IEEE standard 802.3u introduces an auto-negotiation function, also known as an N-way function. The auto-negotiation function enables the Ethernet switch and the Ethernet interface card of a workstation to have the states of each other. Each device can have a number of states. Table 1 is a listing of various combinations of states between the devices. Through the N-way, the data transmission rate (whether operating at 10 Mbps or 100 Mbps), and multiplexing mode (full duplex or half-duplex) of the link partner can be obtained. Hence, a congestion control method to be employed can be determined.

Before auto-negotiation strategies are incorporated into standard specification 802.3u of IEEE, a few manufacturers have already produced Ethernet card is with auto-sensing capability with its own specification. A number of Ethernet switches and Ethernet cards are also shown in Table 1, wherein some of the devices have auto-negotiation functions while some has not.

Due to the rapid progress in semiconductor technologies, the difference of the cost of producing an Ethernet switch and an Ethernet hub is getting smaller. Because of the many advantages of an Ethernet switch, Ethernet hubs are gradually replaced by Ethernet switches. Moreover, since an Ethernet switch can perform the functions provided by an Ethernet hub, the combination of devices detailed in Table 1 is equally applicable to Ethernet switches.

Furthermore, due to the multiplicity of transmission modes between different Ethernet devices, the automatic-negotiation must rely on an algorithm to determine a priority sequence registered in a table, so as to select the optimal transmission mode between two Ethernet devices. For example, a 10/100 Mbps dual speed network card is capable of operating at 10 Mbps or 100 Mbps. To set the transmission mode, the priority sequence table must opt for working in 100 Mbps unless constrained by other factors. Table 2 is a priority setting for the different transmission modes for the Ethernet devices having auto-negotiation capability.

In Table 2, full duplex transmission mode has a higher priority than half-duplex mode because full duplex has a much higher data transmission rate than half-duplex. Transmission mode 10BASE-T has the least priority because it has the slowest data transmission rate. By consulting the priority table 2, the most suitable mode for transmitting data between the Ethernet switch (hub) and the network card can be selected.

TABLE 1

Various combination of states between an Ethernet hub (switch) and Ethernet card achieved through 'auto-negotiation' function or otherwise

|  | Support only 10 BASE-T hub (switch) | Support only 100BASE-T hub (switch) | New generation 10/100TX co-existent network and hub (switch) | New generation of auto-negotiation 10/100TX co-existent hub (switch) |
|---|---|---|---|---|
| Support only 10BASE-T network card | 10 Mbps | Change to a 100 Mbps network card | Manual switching of the hub (switch) to 10 Mbps | Automatic switching of hub (switch) to 10 Mbps |
| Network card with non-standard auto-sensing capability | Automatic switching of network card to 10 Mbps | Automatic switching of network card to 100 Mbps | Automatic switching of network card to 100 Mbps after manual switching of hub (switch) to 100 Mbps | Manual switching of hub (switch) and network card to 100 Mbps |
| 10/100TX co-existent network card with new generation auto-negotiation capability | Automatic switching of network card to 10 Mbps half-duplex | Automatic switching of network card to 100 Mbps | Manual switching of hub (switch) and network card to 100 Bbps | Automatic switching of hub (switch) and network card to 100 Mbps |

TABLE 2

Priority setting of Ethernet devices with auto-negotiation capability

| Priority | Explanations |
|---|---|
| 1 | 100BASE-T2 full duplex |
| 2 | 100BASE-T2 |
| 3 | 100BASE-TX full duplex |
| 4 | 100BASE-T4 |
| 5 | 100BASE-TX |
| 6 | 10BASE-T full duplex |
| 7 | 10BASE-T |

To increase the overall throughput after the best transmission mode is chosen, the Ethernet switch generally provides a congestion control mechanism for transmitting information packets from the transmission ports fluently. According to the resulting auto-negotiation between the destination device (for example, an network card) and the Ethernet switch, one of the following three congestion control modes are adopted: (1) when the destination device has full-duplex transmission capacity and flow control capability, the Ethernet switch will opt for a flow control mode; (2) when the destination device has full-duplex transmission capacity but no flow control capability, the Ethernet switch will opt for a drop control mode; and (3) when the destination device has neither full-duplex transmission capacity nor flow control capability, the Ethernet switch will opt for a back-pressure control mode.

In the aforementioned backpressure control mode, the Ethernet switching controller issues a collision signal to destroy the packet. On detecting the collision, the workstation enters into a binary exponential backoff algorithm to compute a waiting time, and then the packet is re-submitted. In the aforementioned drop control mode, the packet is necessary to be dropped at the source port, so that the packet is not sent to the congested destination port. This is because when the destination port has entered the congestion state, the transmission and receiving paths are different in full duplex mode, such that the collision signal cannot be used to destroy the packet. The packet is dropped at the source port. In the aforementioned flow control mode, the source port enters a flow control mode when the destination port is congested. In subsequent stage, flow control windows (XOFF windows) are triggered. Once XOFF windows are triggered, the Ethernet switching controller controls the flow in/out of packets according to the number of free buffers present. That means, control right is in the receiver.

Before IEEE 802.3u standard is made, flow control capability (FC) has no standard. Many network-device manufacturers set up their own flow control standard. Consequently, after the establishment of flow control standard 802.3u by IEEE, a lot of flow control equipment does not operate in accordance with the new standard. For example, an 'ON' signal for the flow control capability received by the Ethernet switch may not conform to the standard. Hence, actual flow control does not work.

One major drawback of the congestion control method used in the conventional Ethernet switch controller is that the Ethernet switch controller cannot discern whether the connected devices have actual flow control capability or not. As soon as the controller receives a signal from the connected device indicating a flow control capability, the controller issues a flow control frame to the connected device even if the connected device has no standard flow control capability. This fails the flow control.

SUMMARY OF THE INVENTION

Accordingly, one object of the present invention is to provide a switch controller and a method of operating the controller for relieving network congestion substantially. After the switch controller has issued a flow control frame to a connected device, the switch controller waits for the passing of a guard period. The guard period is an interval that permits the input of about three network packets. At the end of the guard period, if there still are new incoming packets from the connected device, the controller switches from a flow control mode of operation to a drop control mode of operation. In other words, the packet is dropped to achieve flow control and avoid the conventional flow control problem.

According to this invention, after the switch controller has issued a flow control frame to a connected device, the switch controller waits for the passing of a period defined as a guard period. At the end of the guard period, if the connected device continues to issue packets after the end of the guard period, this implies that the connected device has non-standard-flow control capability. Flow control mode in use by the controller is immediately changed to drop control mode so that packet can be dropped to achieve proper flow control.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
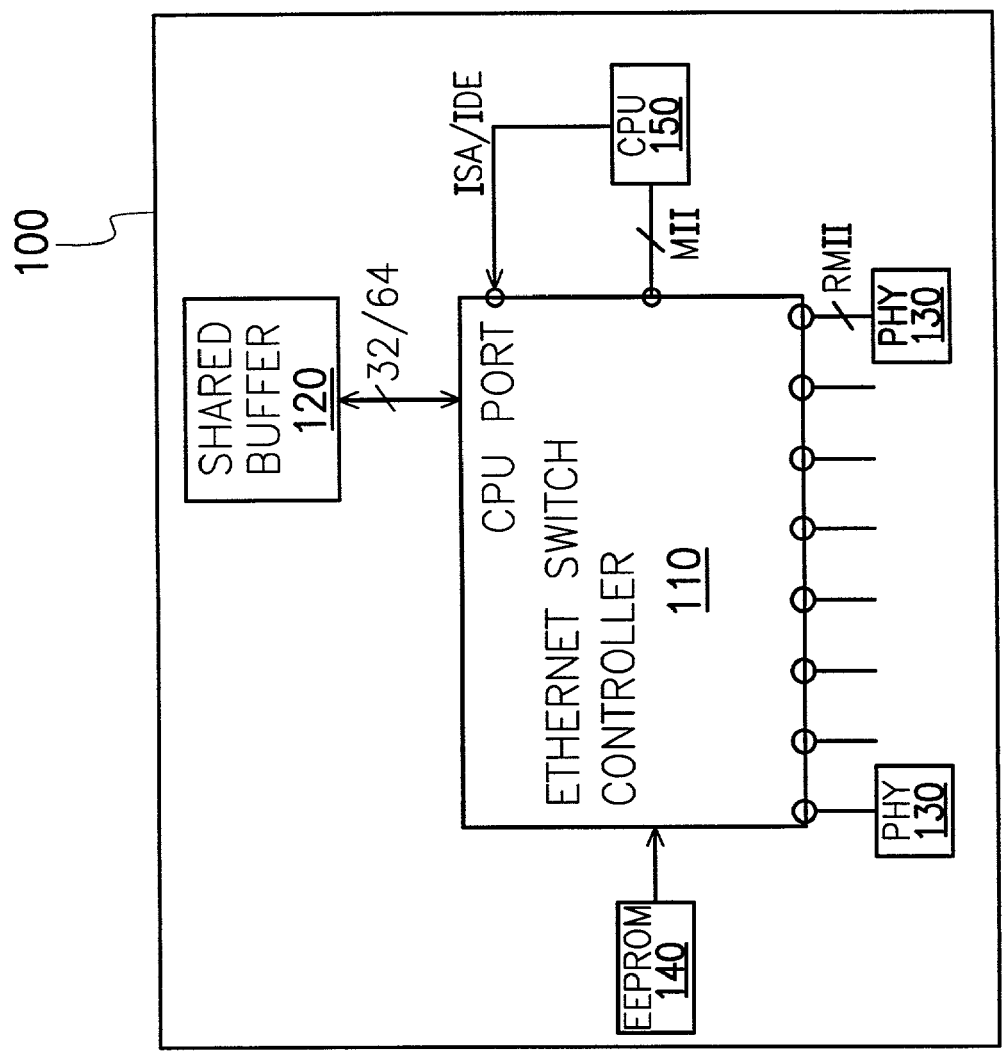
FIG. 1 is a block diagram showing Ethernet switch controller circuit connections of an Ethernet switch according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing Ethernet switch controller circuit connections of an Ethernet switch according to one preferred embodiment of this invention. As shown in FIG. 1, the Ethernet switch 100 includes an Ethernet switch controller 110, a shared buffer 120, a plurality of physical layer devices 130, an electrical erasable programmable read-only-memory (EEPROM) unit and a CPU 150. Size of the shared buffer 120 is determined by jumpers. Ethernet switch controller 110 connects with the CPU 150 at a CPU port via a medium independent interface (MII). Data can also be transmitted between a CPU port on Ethernet switch controller 110 and the CPU 150 via an ISA/IDE interface. In the meantime, Ethernet switch controller 110 connects with the plurality of physical layer devices 130 via a reduced medium independent interface (RMII). The advantage of using RMII is to save pins so that the number of pins used by MII can be reduced from 14 to 6. Consequently, the total pin out for Ethernet switch controller 110 is also reduced.

Figure 2:
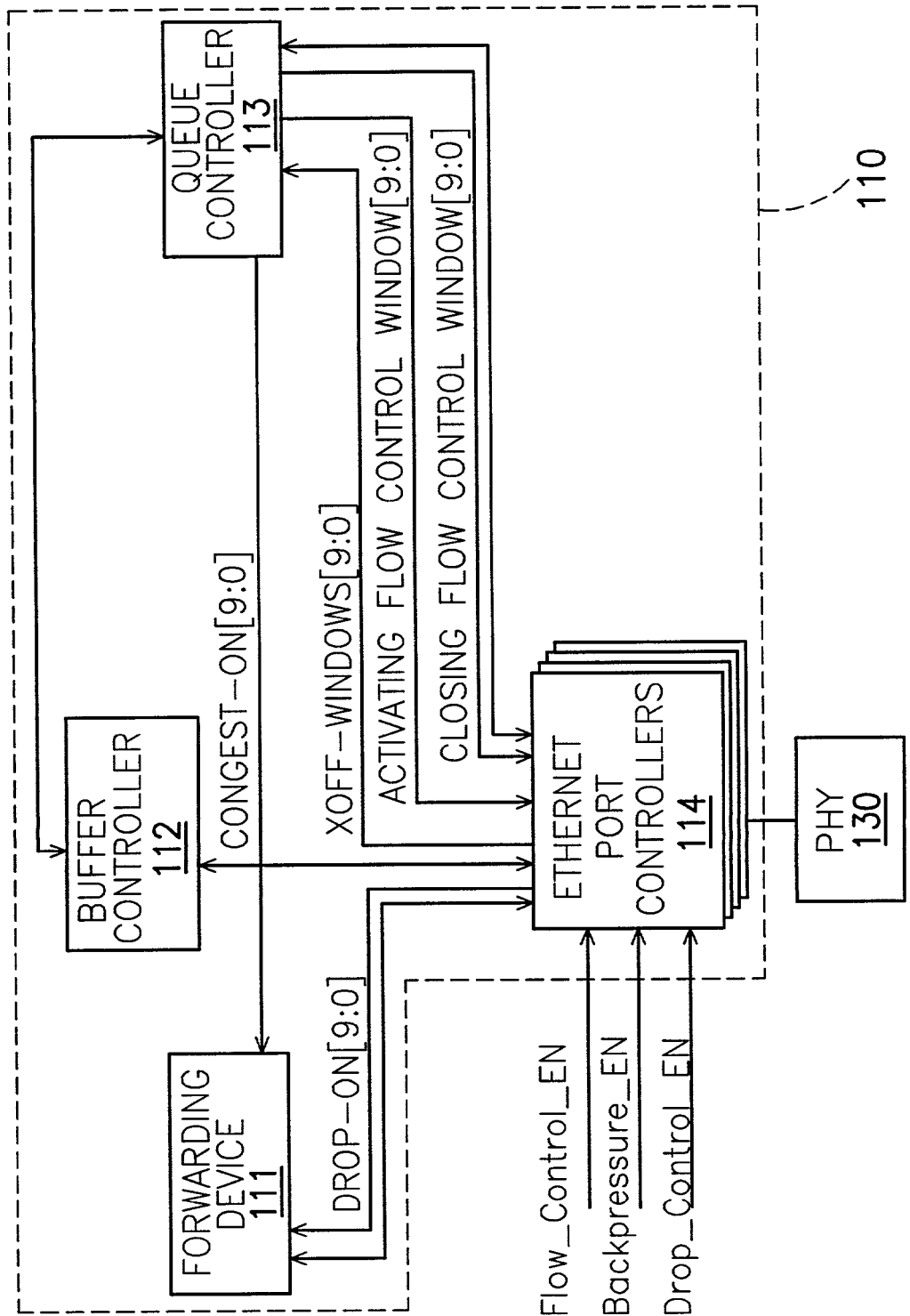
FIG. 2 is a block diagram showing the circuit connections of an Ethernet switch controller according to this invention.

FIG. 2 is a block diagram showing the circuit connections of an Ethernet switch controller according to an embodiment of this invention. As shown in FIG. 2, Ethernet switch controller 110 includes a plurality of Ethernet port controllers 114, a queue controller 113, a forwarding device 111 and a buffer controller 112. The plurality of Ethernet port controllers 114 are connected to the plurality of physical layer devices (PHY) 130 and a plurality of external signal lines (not shown). Through the physical layer devices (PHY) 130, a plurality of state signals of connected devices can be obtained. These state signals includes duplex mode signals and flow control capability signals. According to external signals, such as flow control enable (Flow_Control_En) signals, drop control enable (Drop_Control_En) signals, or backpressure enable (Backpressure_En) signals, the type of congestion control mode employed by switch controller 110 is determined. The flow control enable signals, the drop control enable signals and the backpressure enable signals can be set by jumpers. Ethernet port controllers 114 generate a plurality of flow control window signals (XOFF_Window [9:0]) for the queue controller 113 according to the plurality of state signals. Moreover, drop signals DROP_On [9:0] are enabled according to the plurality of flow control windows and the plurality of external signals.

A forwarding device 111 is coupled to the plurality of Ethernet port controller 114. The forwarding device 111 looks up a table according to the heading on network packets received from Ethernet port controllers 114 to find out destination ports. The drop control mode is determined by congestion-on (CONGEST_ON[9:0]) signal and drop-on (DROP_ON[9:0]) signal. Buffer controller 112 is coupled to the plurality of Ethernet port controllers 114. Buffer within the buffer controller 112 is shared by all the Ethernet port controllers 114. According to the requests submitted by the port controllers 114, a number of buffers within buffer controller 112 are assigned or released.

A queue controller 113 is coupled to the Ethernet port controllers 114, the buffer controller 112 and the forwarding device 111. Each Ethernet port controller 114 has a corresponding output queue in the queue controller 113. According to the request submitted by the port controller 114, the incoming packet is then queued in the corresponding output queue. Furthermore, according to the plurality of window flow control (XOFF_Window[9:0]) signals and the total output queue length, the congestion control mode of each Ethernet port controller 114 is determined. If any output queue in the queue controller 113 is at a congested state, a congest-on (CONGEST_ON) signal is transmitted to the forwarding device 111. In addition, flow control window [9:0] signals are activated to request flow control of the source port.

Figure 3:
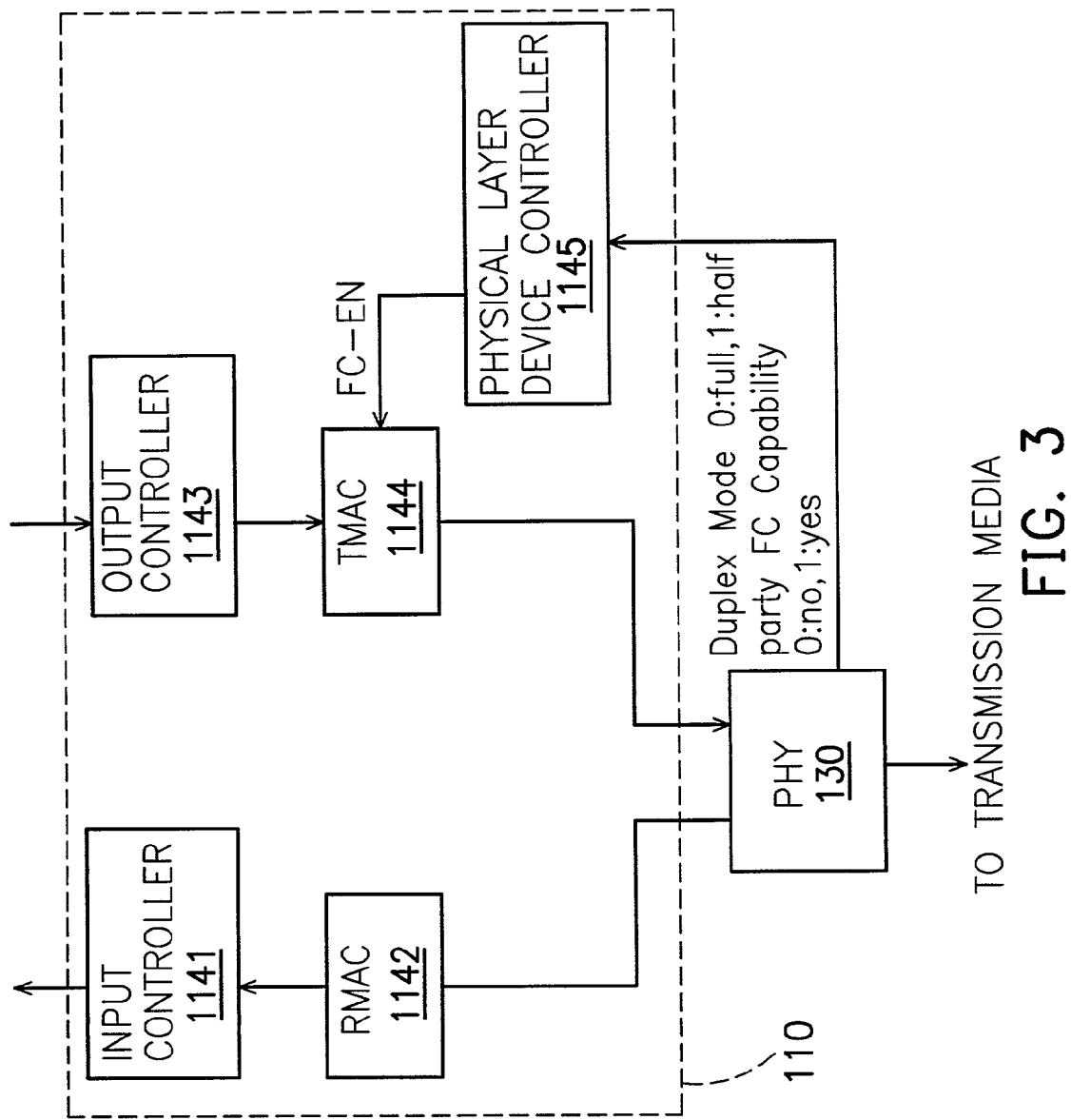
FIG. 3 is a block diagram showing the Ethernet port controller shown in FIG. 2.

FIG. 3 is a block diagram showing the Ethernet port controller shown in FIG. 2. As shown in FIG. 3, each Ethernet port controller 114 includes a receive media access controller (RMAC) 1142, an input controller 1141, an output controller 1143, a transmit media access controller (TMAC) 1144 and a physical layer controller 1145. The RMAC 1142 is coupled to one of the physical layer devices 130. The RMAC 1142 checks the received network packets. A received network packet is accepted if the packet is correct, otherwise the packet is dumped. An input controller 1141 is coupled to the RMAC 1142, the queue controller 113 and the buffer controller 112. According to the amount of the buffers requested by received network packet via the buffer controller 112, the request is sent to the queue controller 113 to request queuing in the output queues. The output controller 1143 is coupled to the queue controller 113 and the buffer controller 112 for outputting packets from the output queue and releasing free buffers to the buffer controller 112. The TMAC 1144 is coupled to the output controller 1143 and one of the physical layer devices 130. According to the plurality of window flow control signals and external signals, a drop-on signal to the forwarding device 111 may be issued so that the network packet submitted by the Ethernet port controller 114 may be discarded. The physical layer controller 1145 is coupled to the TMAC 1144 and one of the physical layer devices 130. According to the plurality of state signals from the physical layer device 130, a flow control enable (FC_EN) signal is transmitted from the physical layer controller 1145 to the TMAC 1144.

Figure 4:
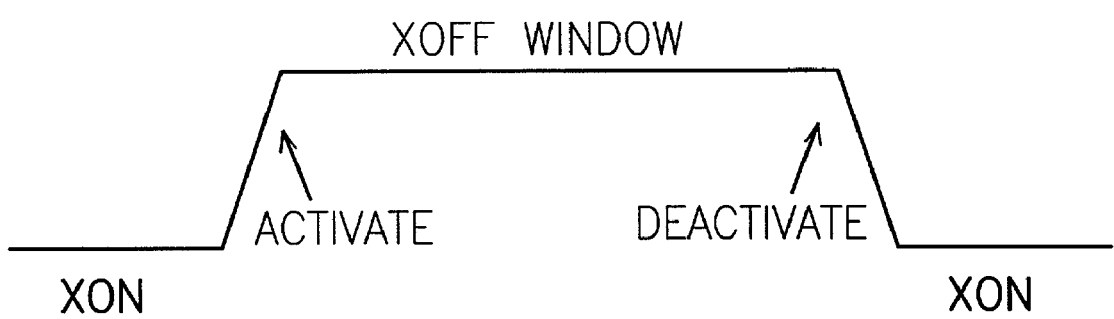
FIG. 4 is a diagram showing the use of XON-XOFF windows according to the flow control method operated by the Ethernet switch controller of this invention.

FIG. 4 is a diagram showing the use of XON-XOFF window in the flow control operated by the Ethernet switch controller of an embodiment of this invention. As shown in FIG. 4, as long as there is no congestion in the Ethernet switch controller 110, all connection ports can normally transcieve network packets. When a particular connection port is congested, the Ethernet switch controller 110 initiates a congestion control according to the results of auto-negotiation. If a backpressure control mode is employed, the Ethernet switch controller 110 issues a collision signal to impact the packet. On detecting the collision, the workstation enters into a binary exponential backoff algorithm to compute a waiting period, i.e. a guard period, to retransmit the packet. In the drop control mode, the packet is dropped at the source port instead of sending to the congested destination port. Because the destination device uses full duplex transmission, so different transmission lines are used for sending and receiving data. Since destruction of the packet by collision signal is not allowed, the packet can only be drop at the source port. This ensures that the packet is not sent to the congested destination port. A flow control mode is used when the Ethernet switch controller and the network card of the workstation can operate in full duplex mode and has flow control capability. As shown in FIG. 4, when the destination port of a packet is congested, the flow control window (XOFF windows) is triggered. Once the XOFF window is triggered, the source port of the Ethernet switching controller 110 sends out a flow control frame that represents XOFF condition. The XOFF window condition is released only when the number of free buffers is sufficient for the destination ports of the Ethernet switch controller 110 to transmit data normally. Once sufficient free buffers are present, an XON flow control frame is issued to return to XON.

In this invention, the flow control is based on XON/XOFF windows. In a XON window, source port is not in a flow control state. Hence, any incoming packets are normally transferred away. If an incoming packet violates congestion control restrictions, flow control state switches from the XON window into the XOFF window after the source port forwards its packet to the output queue of the destination port. In the XOFF window, the source port is in a flow control state. Therefore, any incoming packets can triggers a congestion control operation according to the strategies used. The XON/XOFF windows and DROP enable/disable signal are administrated by TMAC 1144 of Ethernet switch controller 110 according to state of the connection port and the plurality of input signals from queue controller 113.

In addition, related congestion control operations in the XOFF window in FIG. 4 are as follows: (1) Flow control operation: If a unicast or broadcast packet is sent to the output queue, and some congestion control restrictions are violated, queue controller 113 generates a trigger signal to trigger the TMAC 1144 of the source port to send out a flow control frame having a pause time=FFFFH. After the flow control frame is sent, switch controller 110 will wait for a guard period, preferably equal to a period for accepting three packets. If the connected device continues to send out packets after the expiry of the guard period, the connected device is judged to have no standard flow control capability, and operation mode of switch controller 110 is changed from the flow control to a drop control. (2) Backpressure control for a half-duplex connection port: On receiving a non-local packet, the input controller 1141 generates a non-local signal to inform the TMAC 1144. If the flow control is in the XOFF window and operates in a half-duplex mode, the TMAC 1144 destroys the packet. (3) Drop control with retained private buffers: When an incoming packet comes from a source port already in the DROP_ON window and the destination port is already in the congestion control window, the packet is detected during a lookup operation in forwarding device 111, and then the forwarding device 111 removes the destination port mask so that the input controller 1141 can discard the packet. It should be noted that the DROP_ON window informs the drop function of specified connection port to be activated within this time interval, and the DROP_ON window is determined by TMAC 1144.

This invention also provides a network congestion control method. According to a plurality of external signals, a plurality of state signals and flow condition in the Ethernet, an appropriate congestion control mode is selected. The method includes several steps. First, a plurality of packets are transferred to Ethernet port controllers 114. According to the plurality of external signals and the plurality of state signals, controllers 114 generate a plurality of flow control window signals. Destination ports of various packets are determined through table lookup operations in the forwarding device 111. If a destination port is in a congested state and the source port of the packet has no support for flow control capability, the packet is discarded. If the destination port is not in the congested state, a buffer request command is sent to the shared buffer 120. This is followed by another request sent to queue controller 113 for requesting the placement into the output queue corresponding to the destination port. According to the plurality of flow control window signals and the total output queue length, the congestion control mode of each port control device inside the Ethernet port controllers 114 is determined.

The plurality of external signals include a flow control enable signal, a drop control enable signal and a backpressure enable signal. The flow control enable signal, the backpressure enable signal and the drop control enable signal can be determined by jumpers. The plurality of state signals includes a duplex mode signal and a flow control capability signal. A flow control frame can be issued in the flow control mode. The flow control frame includes a 16-bit pause time having a value of FFFFH. When the flow control window is closed, the 16-bit pause time value is 0000. After the issue of a flow control frame, the switch controller 110 waits for a guard period preferably equal to a duration for entering of three packets. After the guard period, if the connected device continues to transmit packets, the connected device is judged not to have standard flow control capability. Hence, the switch controller 110 switches from a flow control mode to a drop control mode. Persons skilled in the art may note that length of the guard period can be adjusted according to applications and other factors.

Size of shared buffer 120 is determined by size of externally connected static random access memory (SRAM). Size of SRAM can be determined by jumpers, for example, 32 K×32 or 64 K×32 SRAM. Moreover, the number of private buffers in shared buffer 120 can be determined by an externally connected EEPROM 140 or CPU 150.

In summary, the Ethernet switch controller and the network congestion control method used by the controller in the invention has the capability of adaptively adjusting from a flow control mode to a drop control mode. Therefore, congestion control is still possible between the Ethernet switch controller of this invention and a connected device not having a standard flow control capability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network congestion control method for an Ethernet switch controller having a plurality of connection ports, the method comprising:
   receiving a first network packet from a source port of the connection ports of the switch controller;
   transmitting a flow control frame from the switch controller to the source port when the switch controller triggers the source port to use a congestion control mode, which at least includes a flow control mode and a drop control mode, and the congestion control mode is in the flow control mode;
   idling for a guard period after transmitting the flow control frame; and
   when a connected device operates in a full duplex mode without flow control capability, changing the congestion control mode of the source port to the drop control mode if the source port still receives a second network packet after idling for the guard period.

2. The method of claim 1, wherein the method further includes the following steps:
   determining a destination port for the first network packet according to an intended destination of the first network packet; and
   deciding to activate the congestion control mode or terminate the congestion control mode according to the congestion mode of the destination port and a number of free buffers available for the switch controller.

3. The method of claim 1, wherein the guard period is a period needed for entering three network packets into the source port.

4. The method of claim 1, wherein the congestion control mode further includes a backpressure control mode, and the backpressure control mode is selected when the connected device operates in a half-duplex mode without flow control capability.

5. The method of claim 1, wherein the flow control mode is selected when the device connected to the connection ports operates in a full duplex mode with flow control capability.

6. A switch controller having a plurality of connection ports, a shared buffer, and a plurality of physical layer devices, the switch controller comprising:
   a buffer controller coupled to the shared buffer for assigning and releasing buffer units;
   a plurality of port control devices, coupled to the physical layer devices and the buffer controller, wherein the port control devices respectively corresponds to the connection ports, and a congestion control mode including at least a flow control mode and a drop control mode is taken, whereby one of the port control devices, corresponding to a source port of the connection ports, receives a first network packet, and the first network packet is stored in the shared buffer;
   a forwarding device coupled to the port control devices, wherein the forwarding device determines a destination port for the first network packet according to information contained in the first network packet; and
   a queue controller coupled to the port control devices and the buffer controller, wherein the queue controller further includes a plurality of output queues respectively corresponding to the port control devices, and the first network packet is queued in the output queue corresponding to the destination port;
   wherein when the congestion control mode of the source port is triggered by the switch controller, a connected device connected to the source port operates in a fufl duplex mode without flow control capability and the congestion control mode is in the flow control mode, the switch controller issues a flow control frame to the source port for idling for a guard period; if the source port still receiving a second network packet after the guard period, the congestion control mode is switched to the drop control mode.

7. The switch controller of claim 6, wherein each of the output queues has a reserved number of the buffer units, and the switch controller switches on or off the congestion control mode for the source port according to the reserved numbers of the buffer units connection port, whereby the number of the buffer units without being assigned is controlled.

8. The switch controller of claim 7, wherein each of the port control devices includes:
   a receiving media access controller (RMAC) coupled to one of the physical layer devices, wherein the RMAC inspects any received packet, if the received packet is correct, the packet is received, and if the received network packet is incorrect, the packet is returned;
   a receiving controller coupled to the RMAC, the queue controller and the buffer controller, wherein the receive controller requests the buffer controller to assign at least one free buffer unit for storing the received packets to request the queue controller to queue the received packet into the corresponding output queue;
   an output controller coupled to the queue controller and the buffer controller for outputting the packet in the output queue and releasing the buffer units occupied by the packet;
   a transmitting media access controller (TMAC) coupled to the output controller and one of the physical layer devices for outputting the packet; and when the congestion control mode is triggered, the TMAC inside the one of the port control devices corresponding to the source port is responsible for sending out a control signal to execute an operation of the congestion control mode; and
   a physical layer controller coupled to the TMAC and one corresponding physical layer device, wherein the physical layer controller is able to obtain a plurality of state signals from a connected device, so as to select a congestion control mode for the port control device.

9. The switch controller of claim 6, wherein the guard period is a period for receiving three network packets into the source port.

10. The switch controller of claim 6, wherein the congestion control mode further includes a backpressure control mode, and the backpressure control mode is selected when the connected device onerates in a half-duplex mode without flow control capability.

11. The switch controller of claim 6, wherein the flow control mode is selected when the connected device operates in a full duplex mode with flow control capability.

* * * * *